United States Patent [19]
Bell

[11] Patent Number: 5,158,800
[45] Date of Patent: Oct. 27, 1992

[54] NON-STICKY, FAT-CONTAINING CONFECTION

[75] Inventor: Virginia Bell, San Marcos, Calif.

[73] Assignee: Merck & Co., Inc., Rahway, N.J.

[21] Appl. No.: 773,052

[22] Filed: Oct. 8, 1991

[51] Int. Cl.$^5$ .............................................. A23G 3/00
[52] U.S. Cl. .................................. 426/660; 426/573; 426/661; 426/601
[58] Field of Search ................ 426/660, 573, 548, 601

[56] References Cited
U.S. PATENT DOCUMENTS

| | | | |
|---|---|---|---|
| 4,326,052 | 4/1982 | Kang et al. | 426/573 |
| 4,326,053 | 4/1982 | Kang et al. | 426/573 |
| 4,410,552 | 10/1983 | Gaffney et al. | 426/660 |
| 4,564,525 | 1/1986 | Mitchell et al. | 426/660 |
| 4,601,907 | 7/1986 | Kneble et al. | 426/660 |
| 4,698,232 | 10/1987 | Shue et al. | 426/660 |
| 4,704,293 | 11/1987 | Moore | 426/660 |
| 4,948,615 | 8/1990 | Zallie et al. | 426/660 |

OTHER PUBLICATIONS

Masutake, Japanese Publication 63,248346.

Primary Examiner—R. B. Penland
Attorney, Agent, or Firm—Richard S. Parr; Charles M. Caruso

[57] ABSTRACT

A non-sticky, fat-containing confection which has a smooth texture and which is quick setting, comprising sugar, fat and gellan gum.

8 Claims, No Drawings

NON-STICKY, FAT-CONTAINING CONFECTION

BACKGROUND OF THE INVENTION

This invention relates to a gellan gum-containing confection which is non-sticky, smooth-textured, and quick setting.

Various high sweetener-content confections are known in the art. Certain of these also have significant amounts of fat.

Zallie et al., U.S. Pat. No. 4,948,615, describe a process for extruding gelled products containing 10-18 wt. % starch, 70-90 wt. % sweetener, e.g. sucrose, fructose, corn syrup solids, and 0-20 wt. % water.

Moore et al., U.S. Pat. No. 4,704,293, describe a process for preparing a gel confection containing sugar, 40-80 wt. % water, 1-20 wt. % of a gelling agent such as starch, and 1-10 wt. % of a gelling agent such as non-hydrated instant starch.

Shue et al., U.S. Pat. No. 4,698,232, describe a confection composition containing 25-45 wt. % fiber composite (dietary fiber powder coated with a fat or glycerin lubricant), 10-15 wt. % foam matrix (gelatin, gum arabic and non-sucrose liquid sweetener) portion, having a density of about 0.3 to 0.5 g/cm$^3$, and 40-60 wt. % amorphous matrix (non-sucrose-containing corn syrup having a solids content of 92-96%). The fiber composite, which may include apple fiber, oat bran fiber, corn bran fiber or guar gum, constitutes a large portion of the fiber-containing confection.

Knebl et al., U.S. Pat. No. 4,601,907, describe a chewing gum base and sweetener outer casing filled with an aerated plastic blend of 55-90 wt. % water-soluble sweet-tasting chewy candy matrix, 5-20 wt. % fat, 0.1-10 wt. % whipping agent and 5-20 wt. % moisture content.

Mitchell et al., U.S. Pat. No. 4,564,525, describe confection products containing 2-5 wt. % roasted dahlia tuber syrup, 0-60 wt. % sweetener and 20-60 wt. % fat.

Gaffney, et al., U.S. Pat. No. 4,410,552, describe a confection having an outer chocolate coating surrounding a composite center containing a semiplastic confection core coated with a fat jacket.

Kang et al., U.S. Pat. Nos. 4,326,052 and 4,326,053, describe gellan gum and procedures for making gellan gum. The gum is described as useful for thickening, suspending and stabilizing aqueous systems, including textile printing pastes, low drift aqueous herbicide compositions, salad dressings, thickened puddings, and adhesive compositions.

Masutake, Japanese Publication 63-248346, describes chocolates containing 0.1% gellan gum, 30% bitter chocolate, 35% sugar, 28% powdered milk and 7% cocoa butter (amounts based on dry weight). The resulting milk chocolate product retained its original shape at 38° C. These chocolates are grainy mixtures which, when set, are non-elastic, hard compositions which resist melting.

SUMMARY OF THE INVENTION

The invention is a non-sticky, smooth-textured, quick-setting confection comprising a) between about 0.45-1.6%, preferably 0.6-0.9% by weight gellan gum, b) between about 69-90.4%, preferably 73-86%, more preferably 78-84% by weight sweetener, and c) between about 8-30%, preferably 8-24%, more preferably 12-18% confection fat.

DETAILED DESCRIPTION OF THE INVENTION

The amount of gellan gum useful for preparing the confection of the invention is critical for achieving the unique and desirable characteristics of the composition of the invention.

The amount of gellan gum present in the confections of the present invention is an important determinant in obtaining confections with desirable qualities. Levels of gellan gum lower than the specified range have an undesirable soft, semi-liquid texture which does not harden. Levels of gellan gum higher than the specified range have a stringy, rubbery quality.

Guar gum, locust beam gum and gum arabic are unsuitable replacements for gellan gum in the formulations of the invention. These gums produce materials which are soft and semi-liquid, and which do not harden.

The compositions of the present invention have a chewy, elastic texture. The flavor, color, and degree of elasticity can be varied with the addition of selected optional ingredients. The compositions, once set, exhibit a high degree of stability when subjected to physical stress, including temperature increases, and mechanical contact with hard materials including packaging equipment and materials.

Gellan gum, described in U.S. Pat. No. 4,326,052 and U.S. Pat. No. 4,326,053, is commercially available from Kelco, a Division of Merck & Co., Inc., as KELCOGEL ™.

Sweeteners useful in the confection of the present invention include, separately or together, solid or liquid sweeteners. Typical liquid sweeteners are fructose syrup, invert sugar, high fructose, corn syrups, starch hydrolysates, hydrogenated starch hydrolysates, glucose syrup, polydextrose, and honey. Typical solid sweeteners include sucrose. Preferred liquid sweetener is corn syrup, and preferred solid sweetener is sucrose.

Saccharine and its various salts, including sodium and calcium salts, dipeptide sweeteners such as aspartame, dihydrochalcone, acesulfame-K (Sunette), glycyrrhizin, *Stevia rebaudiana* (Stevioside) and sugar alcohols such as sorbitol, sorbitol syrup, mannitol, xylitol, and the like, are suitable alternative synthetic sweeteners. Confection fats useful in the confections of the present invention include, separately or together, animal fats and vegetable fats. Typical animal fats are butter and milk fats. Typical vegetable fats are hydrogenated, partially hydrogenated and fractionated vegetable oils. Typical vegetable oils are partially hydrogenated palm kernel oil, fractionated palm kernel oil, palm oil, coconut oil, cottonseed oil, safflower oil, sunflower oil, corn oil, and soy oil. Preferred confection fats are butter and cocoa butter fat. Cocoa butter fat is preferably added as cocoa powder.

The compositions of the instant invention may contain a variety of conventional confection ingredients such as flavorings, colorings, auxiliary, sweeteners, accidulents, lubricants, binders, fillers, emulsifiers, oils and other taste and textural modifiers. Suitable flavorings, including natural and artificial flavors, and mints such as peppermint, menthol, artificial vanilla, cinnamon, various fruit flavors and the like, as well as mixtures thereof, are contemplated. The flavorings are generally utilized in amounts that will vary depending upon the individual flavor, and may, for example, range in amounts of about 0.3 to about 2% by weight and preferably about 0.4 to about 1.8% by weight based on the total weight of the final composition. The amount utilized of these flavoring agents is not critical and is a matter of preference. Similarly, where dry fruit is used as the flavor source, the amount used is a matter of preference and can vary from about 1% to about 12% by weight, preferably about 4% to about 8% weight of the total food product. It is within the scope of this invention to utilize natural fruits and fruit extracts in combination with flavoring agents. Examples of dried fruits include, but are not limited to, apples, apricots, peaches, bananas, pineapples, oranges, grapefruits, prunes, raisins and the like. Freeze dried fruit powders are also suitable additives to the confection products of the present invention.

The following examples serve to provide further appreciation of the invention but are not meant in any way to restrict the effective scope of the invention. All percentages throughout the specification are by weight % of the final composition unless otherwise indicated. Three exemplary formulations (A, B, and C) are shown in Example 1.

Gellan containing confections are prepared according to the following general procedure:
1. Sweeteners are combined, stirred, and heated to about 50-70 degrees C.
2. Dry ingredients (including gellan gum), other than confection fat and other minor ingredients listed in step 4, are added, and the mixture is heated to an boil. Boil temperature is approximately 108-113 degrees C. Heating and stirring is continued for an additional minute.
3. Confection fat is added and stirred until melted and mixed in.
4. The mixture is poured into a prewarmed blender and one or more optional ingredients (magnesium caseinate, calcium caseinate, sodium caseinate, tricalcium phosphate, dried egg whites, milk protein isolate-TMP, calcium chloride, non fat dried milk solids, 10-24% butter fat cocoa powder, and defatted cocoa powder) are added.
5. Blended dry ingredients are mixed in and sheared at high speed until confection is well blended.
6. The confection blend is then poured into container or onto a marble table to set.

| Ingredients | Percent | | | |
| --- | --- | --- | --- | --- |
| | A | B | C | D |
| Corn syrup, HFCS - ISOSWEET 5500 (Staley) | 42.70 | 42.70 | 42.70 | 42.70 |
| Corn syrup, 42 DE (Staley) | 35.81 | 35.81 | 35.81 | 35.81 |
| Butter | 8.30 | 8.30 | 8.30 | 8.30 |
| Cocoa powder (10-24% butter fat) | 6.65 | 6.65 | 6.65 | — |
| Defatted cocoa powder (0.5% butter fat) | — | — | — | 6.65 |
| Sucrose, granulated | 5.06 | 5.37 | 4.22 | 4.82 |
| KELCOGEL gellan gum | 0.76 | 0.45 | 1.60 | 1.00 |
| Sodium chloride | 0.30 | 0.30 | 0.30 | 0.30 |
| Sodium citrate, hydrous granular (Pfizer) | 0.30 | 0.30 | 0.30 | 0.30 |
| Lecithin (Central Soya) | 0.12 | 0.12 | 0.12 | 0.12 |

These gelled confections, when subjected to heat in a pyrex beaker, scorched before melting. They melted when microwaved 20-40 seconds.

EXAMPLE 2

Same as Example 1, except 2% dried egg whites are added with cocoa powder.

Quality—Quick setting, chewy texture, lighter in color than 1.

EXAMPLE 3

Same as Example 1, except 2% magnesium caseinate, (Alanate 340, New Zealand Milk Products) are added with cocoa powder.
Quality—Softer than Example 1.

EXAMPLE 4

Same as Example 1 except 2% calcium caseinate (Alanate 312, New Zealand Milk Products) are added with cocoa powder.
Quality—Firmer than Example 1.

EXAMPLE 5

Same as Example 1 except 2% calcium chloride is added with cocoa powder.
Quality—Firmer than Example 1.

EXAMPLE 6

Same as Example 1 except 2% sodium caseinate (Alanate 110, New Zealand Milk Products) is added with cocoa powder.
Quality—Initially softer than Example 1, but firmness increases over time.

EXAMPLE 7

Same as Example 1 except 2% milk protein isolate (TMP 1150, New Zealand Milk Products) is added with cocoa powder.
Quality—Superior chololate flavor than Example 1.

EXAMPLE 8

Same as Example 1 except 2% non fat dried milk solids is added with cocoa powder.
Quality—Same as Example 1.

EXAMPLE 9

Same as Example 1 except 2% tricalcium phosphate (Stauffer Chemical) is added with cocoa powder.
Quality—Same as Example 1.

What is claimed is:
1. A confection composition consisting essentially of:
   (a) 0.45-1.6% by weight gellan gum;
   (b) 69-90.4% by weight sweetener, wherein the sweetener is one or more selected from the group consisting of solid sweeteners and liquid sweeteners, or combinations thereof; and
   (c) 8-30% confection fat, wherein the confection fat is selected from the group consisting of animal fats and vegetable fats wherein said composition is non-sticky, smooth textured and quick setting.
2. A confection of claim 1, wherein the solid sweetener is sucrose.
3. A confection of claim 1, wherein the liquid sweetener is selected from the group consisting of fructose syrup, invert sugar, high fructose, corn syrups, starch hydrolysates, hydrogenated starch hydrolysates, glucose syrup, polydextrose, and honey.
4. A confection of claim 1, wherein the animal fat is selected from the group consisting of butter and milk fats.
5. A confection of claim 1, wherein the vegetable fat is selected from the group consisting of hydrogenated, partially hydrogenated and fractionated vegetable oils.
6. A confection of claim 5, wherein the vegetable oil is selected from the group consisting of partially hydro- genated palm kernel oil, fractionated palm kernel oil, palm oil, coconut oil, cottonseed oil, safflower oil, sunflower oil, corn oil, soy oil, or mixtures thereof.

7. A confection of claim 1 consisting essentially of 0.6-0.9% gellan gum, 73-86% sweetener, and 8-24% confection fat.

8. A confection of claim 7 consisting essentially of 0.7-0.8% gellan gum, 78-84% sweetener, and 12-18% confection fat.

* * * * *